Nov. 9, 1965 G. WOLFF 3,217,315

MAGNETIC DIGITAL ENCODERS

Filed March 28, 1961 3 Sheets-Sheet 1

INVENTOR.

Nov. 9, 1965 G. WOLFF 3,217,315

MAGNETIC DIGITAL ENCODERS

Filed March 28, 1961 3 Sheets-Sheet 2

*INVENTOR.*

INVENTOR.

United States Patent Office
3,217,315
Patented Nov. 9, 1965

3,217,315
MAGNETIC DIGITAL ENCODERS

Gunther Wolff, Westport, Conn., assignor to Machine Tool Automation, Inc., Southport, Conn., a corporation of Connecticut Filed Mar. 28, 1961, Ser. No. 98,975
12 Claims. (Cl. 340—347)

This invention relates to improvements in the design of the soft iron variety of magnetic digital encoders as disclosed in U.S. Patent No. 2,942,252 and U.S. Patent No. 3,003,145 dated October 3, 1961. More specifically, the invention relates to an improved digital encoder which is employed to transduce a mechanical positional quantity into a quantitized and/or coded electrical signal. Furthermore, mechanical-electrical transducing is accomplished by a two-winding stationary pick-off core in conjunction with a magnetically codified movable member.

Magnetic digital encoders as disclosed in the above referenced patent and application have found excellent acceptance for use in automatic control systems. However, there are ever increasing demands for greater miniaturization, higher resolution and decreased cost.

It is, therefore, the object of this invention to provide design features which used singly or in combination will improve magnetic digital encoders in the areas of compactness, resolution and ease of manufacture.

A more specifiic object of this invention is to obviate the need for protuberances from a cylindrical structure by placing the magnetic pick-off on the inside of the code drum. This object is facilitated by the provision of a drum with a magnetic code pattern generated on its inside surface.

A further object of this invention is to improve the resolution capability of magnetic encoders by providing a means for generating very fine pitch code patterns, by means for obtaining very small air gaps and by means for providing a low reluctance, low loss magnetic flux path.

A further object of this invention is to facilitate ease of manufacture of magnetic encoders by providing an inexpensive means of generating a magnetic code pattern on the inside of a drum, by means for achieving and maintaining a small air gap without recourse to special, high-precision machining methods, and to provide a simple method for manufacture and assembly of laminations and magnetic focusing bars.

The above, as well as other objects and novel features of the invention will become apparent from the following specification and accompanying drawings in which.

Figure 1:
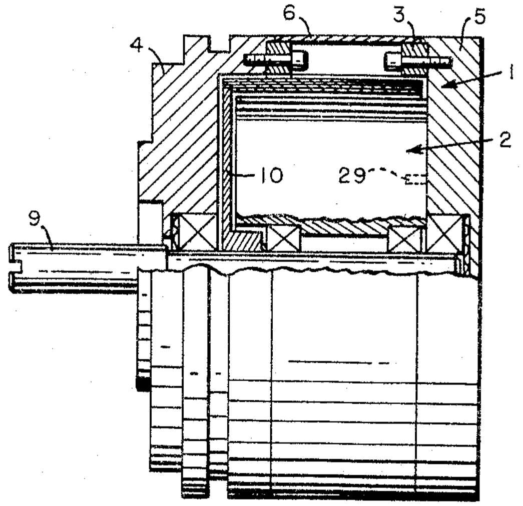
FIGURE 1 is a partially sectional elevational view of a magnetic digital encoder to which some of the principles of the invention have been applied.

Referring to the drawings, and particularly to FIG. 1, the principles of the invention are shown as applied to a digital encoder including a rotating drum member 1, a stationary pick-off head assembly 2 and a housing consisting of frame 3, front end cap 4, rear end cap 5 and cover 6.

Figure 2:
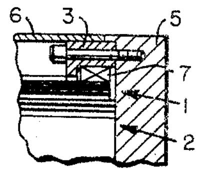
FIGURES 2 and 3 are sectional views of one end of the drum member of FIG. 1, showing alternative forms of supporting said drum member.

In FIG. 2 there is shown a means for more rigidly supporting the open end of the drum member 1 (if this should be required) by means of a suitable bearing 7 mounted in the stationary housing and cooperating with the outside surface of said drum member.

Figure 3:
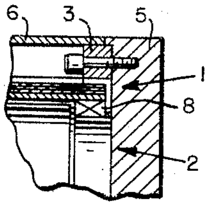

FIG. 3 shows an arrangement similar to that of FIG. 2, in which the bearing 8 is mounted to the stationary head assembly 2 and now cooperates with the inside surface of drum member 1.

Figure 4:
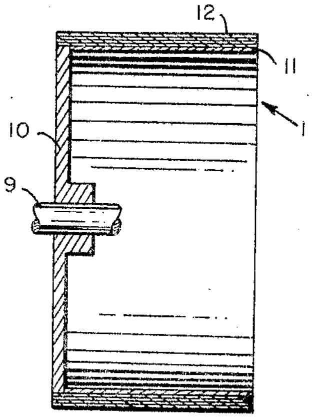
FIGURE 4 is a sectional view showing a more detailed view of the drum member of FIG. 1.

FIG. 4 show a detailed view of the construction of one type of drum member 1 that may be used in the invention. The shaft 9 supports a hub 10, which in turn supports the cylindrical code track 11 made of the soft iron variety of magnetic material, as well as a backing 12. It is, of course, within the scope of this invention to eliminate the backing and permit the depressed portions of the code pattern to completely penetrate through the thickness of the cylindrical portion of the drum member.

Figure 5:
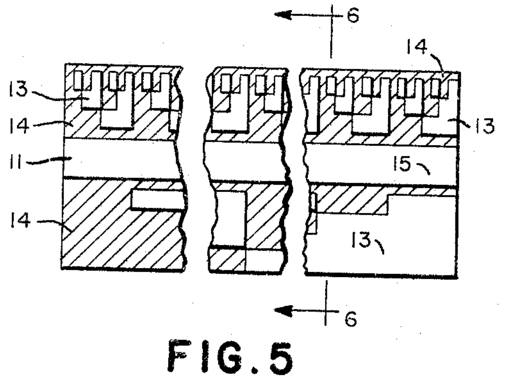
FIGURE 5 shows the inside surface of the drum of FIG. 4 as a developed view of the cylindrical outer portion.

In FIG. 5 there is shown a typical code track 11 in which there are raised portions of metal 13 and depressed portions 14, or through holes. The raised portions 13 may correspond to a binary "one" as the drum 1 is rotated past the stationary read-line, while the depressed portions 14 correspond to a binary "zero." In this particular embodiment of the invention there is also used a magnetic common return track 15.

Figure 6:
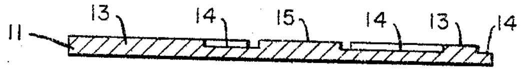
FIGURE 6 is a sectional view of the code track taken substantially along line 6—6 of FIG. 5.

In FIG. 6 there is shown one method of producing the code track 11 of FIG. 5 in which the depressed portions 14 are formed or cut into the solid metal. It is, of course, within the scope of this invention to prepare this code track in a circular rather than a flat shape.

Figure 7:
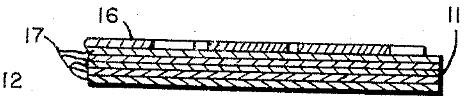
FIGURE 7 shows an alternative method of construction of the code track.

In FIG. 7 there is shown an alternative method of construction of the code track 11 in which one or more top laminations 16 have through holes. These laminations are then fastened to one or more backing laminations 17.

Figure 8:
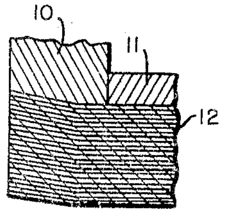
FIGURES 8 and 9 are sectional views of one end of the drum member showing alternative forms of fabrication.
Figure 9:
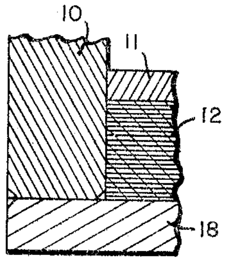

FIG. 8 shows one method of attaching the code track 11 and the backing 12 to the hub 10 by means of peening the backing material into a bevel groove on the hub. FIG. 9 shows another method, in which an outer sleeve 18 is added over the code track 11 and backing 12. The outer sleeve 18 can then be attached to the hub 10 by welding or other suitable means.

Figure 10:
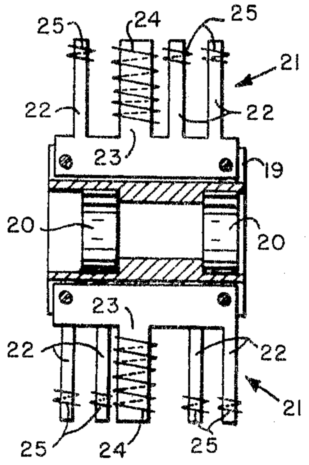
FIGURE 10 is a partially sectional elevation showing a more detailed view of the pick-off head assembly of FIG. 1.

FIG. 10 shows a detailed view of the construction of one type of head assembly member that might be used in the invention. The support frame 19 is bored to receive two bearings 20. Two lamination stacks 21 are fastened to it. The laminations incorporate a suitable number of magnetic probes 22 and one or more common magnetic return paths 23. The laminations also support coils 24, 25 which may be arranged as shown, where 24 are common exciting coils and 25 are pick-off coils. Thus, as an alternating current or a pulse current flows in the exciting coil, a corresponding voltage will be induced in the pick-off coils by transformer action. The amount of induced voltage, however, will be a direct function of the magnetic coupling between the exciting and pick-off coils. This coupling in turn is controlled by the reluctance of the magnetic circuit which in turn, in this invention, is controlled by the raised and depressed portions 13 and 14, respectively, on the movable member.

Figure 11:
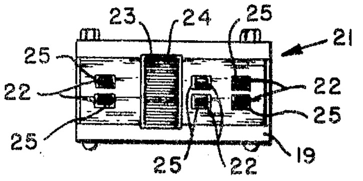
FIGURES 11 and 12 are top and side views, respectively, of FIG. 10.

FIG. 11 shows a top view of FIG. 10. There are shown two pick-off probes 22 per track, symmetrically displaced about the read-line. This method may be used to assist in ambiguity resolution by the well known methods of V-scan or U-scan.

Figure 12:
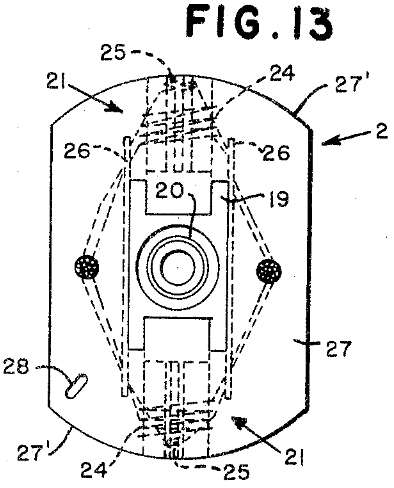

FIG. 12 shows a side view of FIG. 10. There is shown a convenient method of connecting the coils to the external leads by means of the terminal boards 26. The whole assembly is cast into a tough moulding compound 27. After the plastic moulding compound has hardened, the whole head assembly may have its outer diameter 27′ ground while it is rotated about a shaft inserted through bearings 20. As these same bearings are used to locate the head concentrically with the drum, it will become apparent to those skilled in the art that the outer diameter will also run concentrically with the drum within the very close tolerances of precision bearing design. The pin hole 28 may be used to engage with the pin 29 in FIG. 1 to prevent rotation of the head assembly 2.

Figure 13:
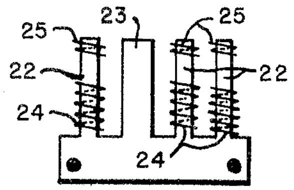
FIGURE 13 shows an alternative arrangement of coils to that shown in FIG. 10.

FIG. 13 shows an alternative arrangement of exciting coils 24 and pick-off coils 25.

Figure 14:
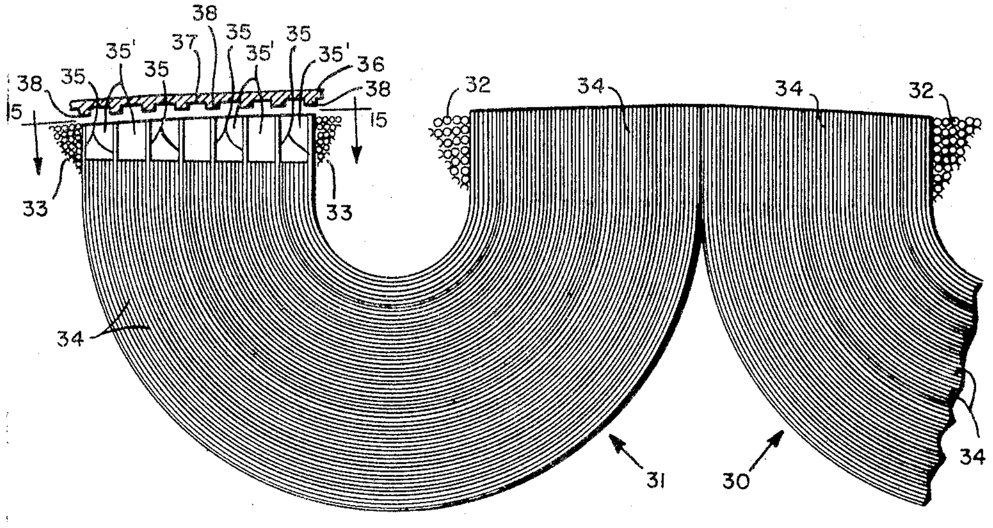
FIGURE 14 is a sectional elevation of an alternative method of construction of each pick-off head of FIG. 1.

FIG. 14 is a sectional elevation of an alternative method of single head construction, which might be used to obtain higher resolutions than those obtainable with the head design of FIG. 10. The core may consist of two identical halves 30 and 31. Both halves are surrounded by a common exciting coil 32, and each half carries a pick-off coil 33, only one being shown. The cores consist of leaves of thin magnetic material 34, most of which stop short of the pick-off end of the core. Only a few, equally spaced laminations 35 protrude to the air gap. The spaces 35′ between these laminations 35 may be filled in with electrically conductive material, or may be left open. The whole assembly is then usually encased in a tough moulding compound, which also makes provision for fastening the head to the housing of the encoder. Also shown is a typical code track 36, with depressed portions 37 slightly wider than raised portions 38. The spacing of the protruding laminations 35 is equal to the spacing of the raised portions 38 on the code track 36, so that the flux flow in several parallel legs is additive, and all sensed by the pick-off coil 33. The alignment of the protruding laminations in the other core 30 (not shown) with respect to the protruding laminations 35 may be such that when one group of protruding laminations is subject to a minimum reluctance through the code track, then the other group is subject to maximum reluctance. The two pick-off coils may then be connected in series-bucking, and not only will the output signal be reinforced but also the steady null-voltage will have been substantially eliminated.

Figure 15:
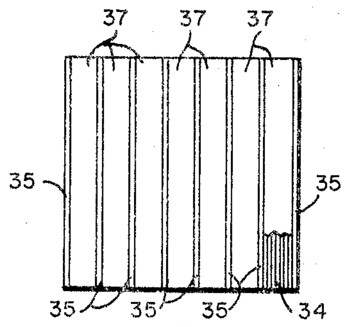
FIGURES 15 and 16 are top views of a section of FIG. 14, showing two alternative methods of construction.
Figure 16:
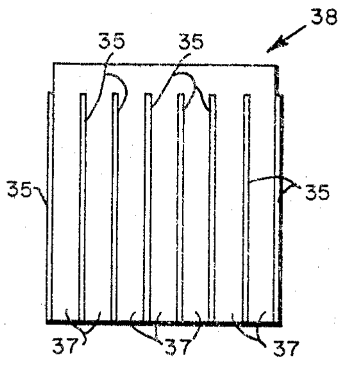

FIGS. 15 and 16 are top views taken substantially along line 15—15 of FIG. 14. FIG. 15 shows separate fillers 37 between the protruding laminations 35. FIG. 16 shows these fillers 37 connected together at one end to form a comb 38. This procedure facilitates handling during manufacture.

Figure 17:
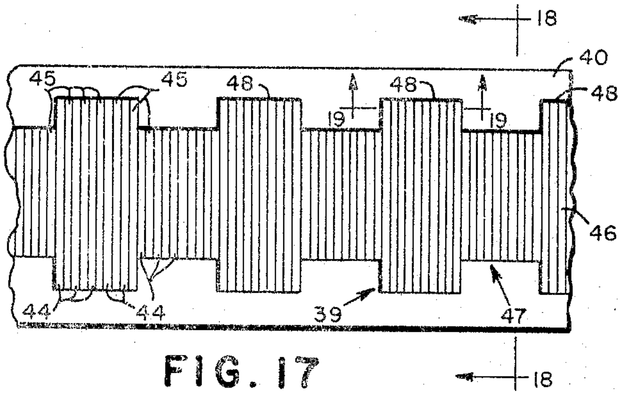
FIGURE 17 shows an alternative method of construction of a portion of the drum as shown in FIG. 5.

FIG. 17 shows a method for obtaining a very high-resolution code track which may be used instead of, or in combination with, the code tracks shown in FIGS. 5, 6 and 7. It is possible, by well known techniques, to produce a bonded laminate material of alternate layers of magnetic material 44 and nonmagnetic material 45, which latter may be electrically conductive. Typically each layer may be .001 inch thick and there may be a total of twenty layers. This laminate can then be cut into short pieces and arranged side by side, so that a long code track 46 with .001 inch bit spacing could be achieved; however, the difficulty arises that the total thickness tolerance on each piece would have to be prohibitively small in order to prevent a disastrous tolerance build-up along the code track. In the present invention this problem has been eliminated by slitting the laminate material into two different widths, and then inserting the narrower pieces 47 and the wider pieces 39 in an indexing track 40, since the spacing of the notches 48 on the track can easily be held within required tolerances.

Figure 18:
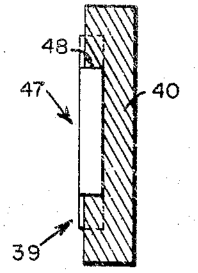
FIGURE 18 is a sectional view taken substantially along line 18—18 of FIG. 17.
Figure 19:
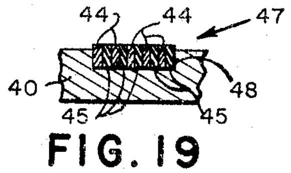
FIGURE 19 is a sectional view taken substantially along line 19—19 of FIG. 17.

FIGS. 18 and 19 are sectional views taken respectively along lines 18—18 and 19—19 of FIG. 17.

Figure 20:
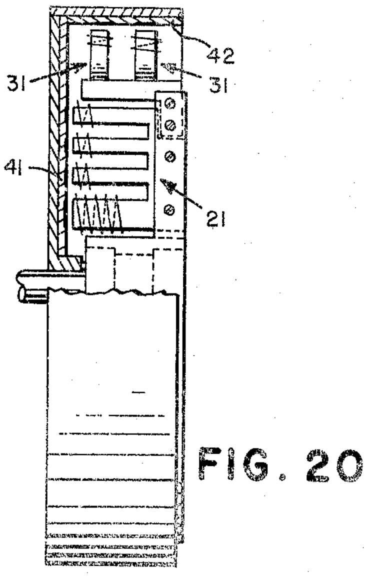
FIGURE 20 is a partially sectional elevation showing an alternative arrangement to FIG. 1 of drum and pick-off head assemblies.

FIG. 20 shows an alternative arrangement to that of FIG. 1, in which a drum type movable code member 42 is combined with a disc type 41 such as disclosed in U.S. Patent 2,942,252. The advantage of using the disc 41 in combination with the drum 42 is that this may result in the best space economy for a given requirement of encoder. The disc for the high order of significance of digits provides the most economical space distribution compatible with proper signal definition, and for the more critical low order of significance digits, both a maximum radius and a closely controllable air gap are provided.

Although the various features of the new and improved magnetic digital encoder have been shown and described in detail to fully disclose one embodiment of the invention, it will be evident that changes may be made in such details and certain features may be used without others without departing from the principles of the invention.

What is claimed is:

1. In a magnetic digital encoder, drum means comprising magnetic material, said magnetic material on the inside surface of said drum means being formed in an undulating pattern, and said undulating pattern being coded in accordance with digital encoder technique; and head means comprising exciting coils and pick-off coils, said pick-off coils being responsive to the change in magnetic reluctance caused by relative rotation between said head means and drum means.

2. A device according to claim 1 in which said head means is constructed with a bearing at its center for the purpose of facilitating concentric alignment between said drum means and said head means.

3. A device according to claim 1 in which one end of said drum means is supported by a bearing on the outside of said drum means.

4. A device according to claim 1 in which one end of said drum means is supported by a bearing on the inside of said drum means.

5. Ia magnetic digital encoder, a cup-shaped member comprising magnetic material, said magnetic material on the inside flat and cylindrical surfaces of said cup-shaped member being formed in an undulating pattern, said undulating pattern being coded in accordance with digital encoder technique; head means comprising exciting coils and pick-off coils, said pick-off coils being responsive to the change in magnetic reluctance caused by relative rotation between said head means and drum means.

6. In a magnetic digital encoder, a plurality of heads for said encoder, each head comprising a plurality of pick-off probes; and one additional probe providing a common low reluctance magnetic return path for said pick-off probes.

7. A device according to claim 6 in which a common exciting coil is wound around said common magnetic return path.

8. In a magnetic digital encoder, a codified member; and a plurality of heads comprising tape wound C-cores with a plurality of projecting laminations at one end.

9. A device according to claim 8 in which two C-cores are placed side by side and an exciting coil is wound over the common legs of said C-cores.

10. A device according to claim 8 in which electrically conducting bars are placed between said projeting laminations.

11. A device according to claim 10 in which the electrically conducting bars are connected at one end to form a comb shape.

12. In a magnetic digital encoder, a movable member coded in accordance with digital encoder technique, and comprising a plurality of laminated strips arranged in a holding strip which has accurately spaced indexing notches, said laminate consisting of alternate layers of magnetic and non-magnetic materials.

References Cited by the Examiner

UNITED STATES PATENTS 2,080,100 5/37 Tauschek ------------ 340—147

MALCOLM A. MORRISON, *Primary Examiner.*

JOHN F. BURNS, *Examiner.*